Nov. 18, 1930.   F. W. GAY   1,782,262
MEANS AND METHOD OF CONNECTING ELECTRICAL MACHINES WITH TRANSFORMER BANKS
Original Filed June 3, 1927   3 Sheets-Sheet 1
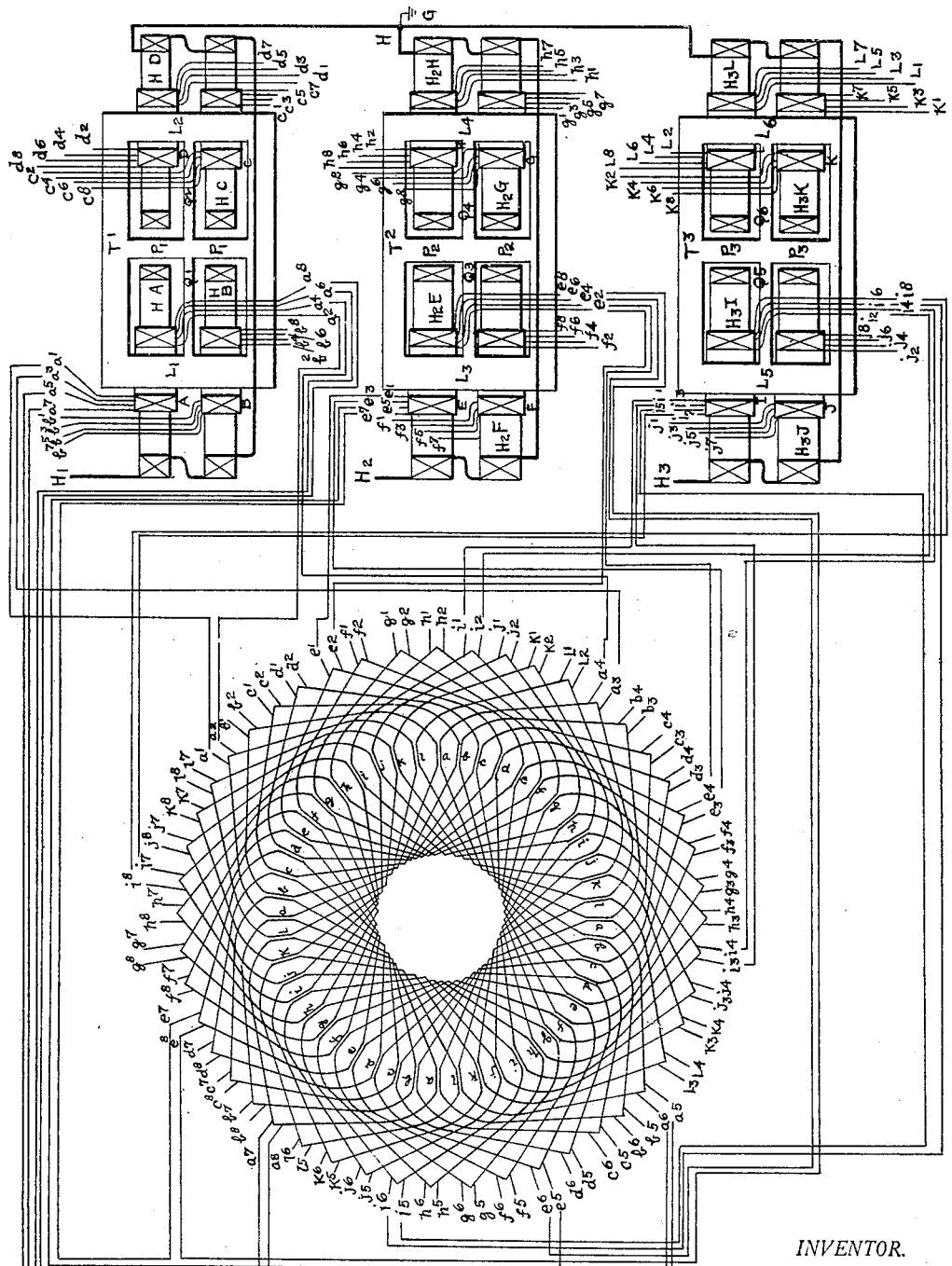
INVENTOR.
Frazer W. Gay,
BY George D. Richards,
ATTORNEYS.

Nov. 18, 1930.  F. W. GAY  1,782,262
MEANS AND METHOD OF CONNECTING ELECTRICAL MACHINES WITH TRANSFORMER BANKS
Original Filed June 3, 1927  3 Sheets-Sheet 2
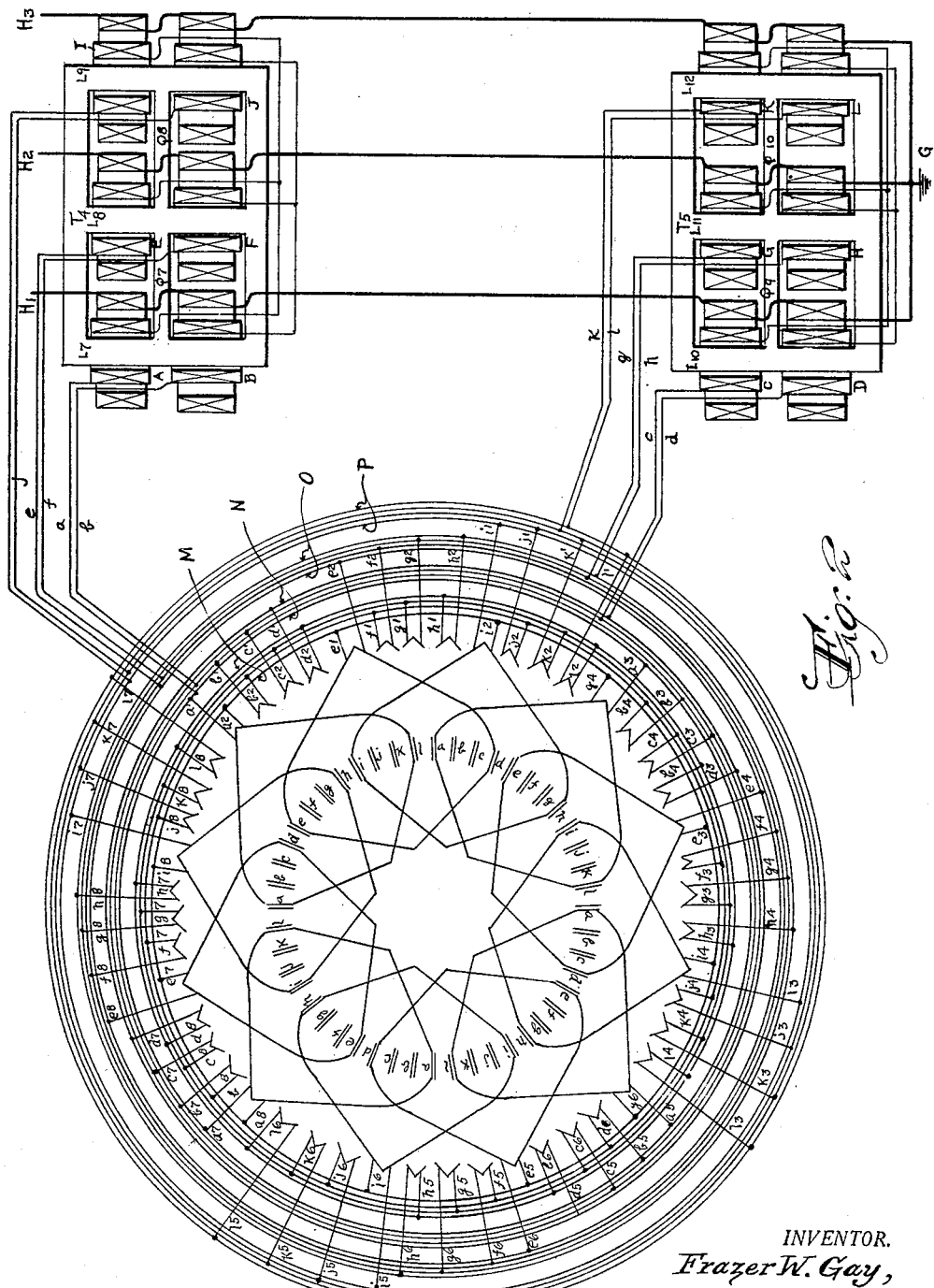
INVENTOR.
Frazer W. Gay,
BY
George D. Richards
ATTORNEYS.

Nov. 18, 1930.  F. W. GAY  1,782,262
MEANS AND METHOD OF CONNECTING ELECTRICAL MACHINES WITH TRANSFORMER BANKS
Original Filed June 3, 1927   3 Sheets-Sheet 3
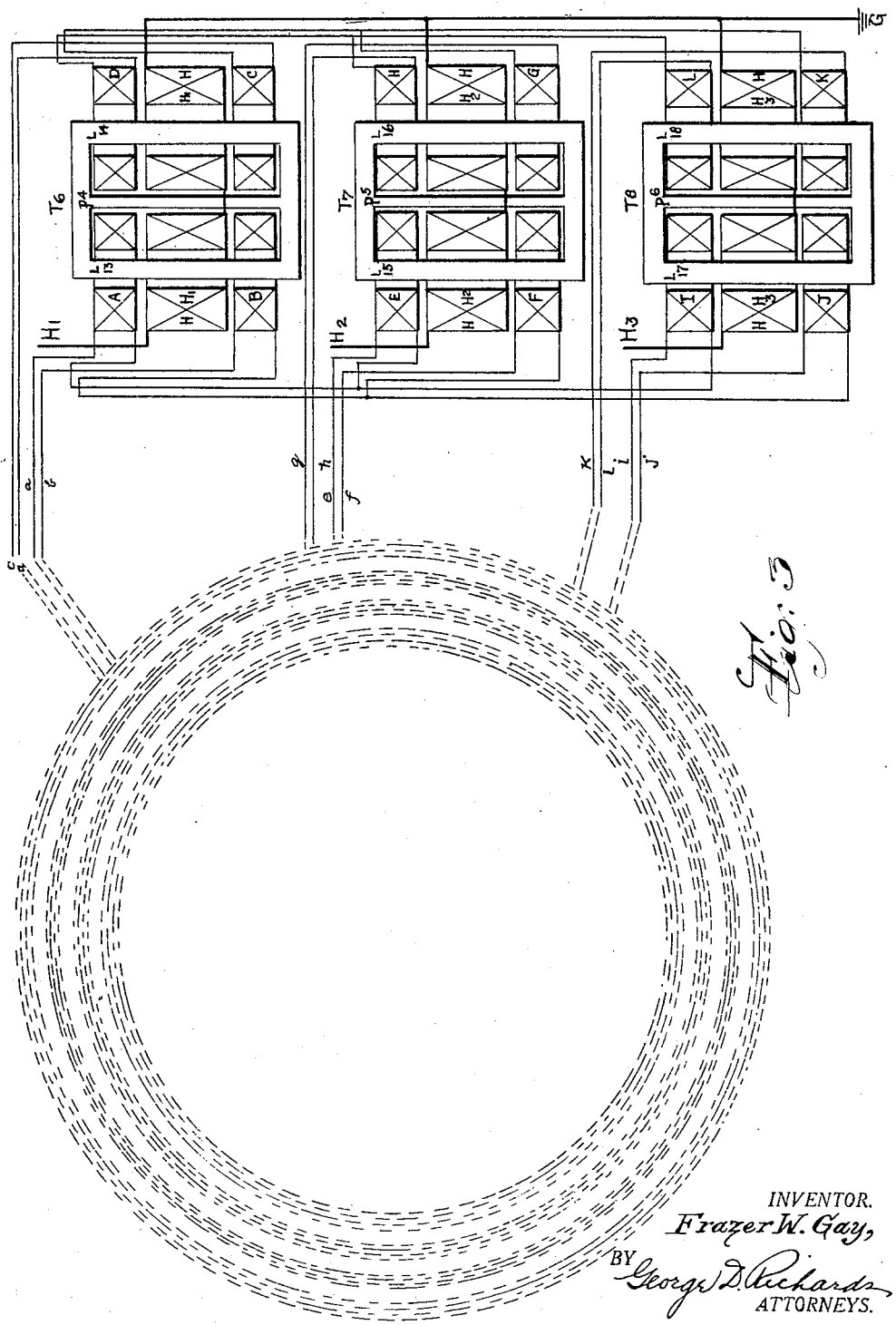
INVENTOR.
Frazer W. Gay,
BY
George D. Richards
ATTORNEYS.

Patented Nov. 18, 1930

1,782,262

UNITED STATES PATENT OFFICE

FRAZER W. GAY, OF NEWARK, NEW JERSEY, ASSIGNOR TO GENERAL ELECTRIC COMPANY, A CORPORATION OF NEW YORK

MEANS AND METHOD OF CONNECTING ELECTRICAL MACHINES WITH TRANSFORMER BANKS

Application filed June 3, 1927, Serial No. 196,218. Renewed April 7, 1930.

This invention relates, generally, to an improved means and method of interconnecting the armature windings of alternating current electrical machines, and especially alternating current generators and motors of large size, with transformer banks; and is a continuation-in-part of my application Serial No. 85,531 filed February 2, 1926.

This invention has for its principal objects to provide a novel means and method of so interconnecting electrical machines and transformer banks that existence of high voltage between adjacent coils in the same stator slot may be eliminated; that the existence of high voltage between the connection ends of adjacent machine coils may be eliminated; that the maximum voltage generated in the machine may be greatly reduced over present practice; that any two coils occupying a stator slot in common may be connected together in the slot without setting up a short circuit; that any two adjacent coils may be connected together at the end connections thereof without setting up a short circuit; and that a stator coil in each electrical circuit may ground without setting up a short circuit; in short the invention has for its principal object to effect phase segregation in generator and motor windings.

In the character and method of winding the armatures of high voltage electrical machines, as heretofore practiced, certain disadvantages and difficulties have presented themselves, viz., it has been necessary to provide very costly and carefully prepared and applied insulation for each armature winding coil in order to insure said coils against grounds or shorts, since due to the very high voltage between adjacent coils and between coils and ground, said insulation is subject to high electrical stress, and many of the coils may be subjected to an excessively high voltage stress at times of trouble on the electrical circuits to which the machine is connected, all of which is likely to break down even the best insulation and result in damaging grounds or shorts. Since in present practice most of the circuits, to which high voltage electrical machines are connected, are intentionally kept grounded at some point, and since even ungrounded circuits are subject to grounds resulting from trouble or accidental causes, a single weak point developing in the insulation between any coil and ground will very likely cause more or less complete destruction of the entire winding before the voltage generated in the machine can be killed and the consequent fire extinguished, and may even cause severe damage to the iron core laminations or other parts of the machine. A failure of insulation between adjacent coils is very likely to be almost equally disastrous. In a machine wound and connected in accordance with my invention any such failure is much less likely to occur because adjacent coils are not in the same electrical circuit and voltage stresses where existent are of relatively low value. Furthermore should such a failure occur, damaging currents will not follow, and such a failure will not interfere with the operation of the machine; but may be detected by routine inspection and tests and repair made when convenient.

It is the object of this invention, therefore, to overcome the disadvantages and difficulties above mentioned, and to such end I provide a novel means of connection between the armature windings of the electrical machine and a transformer bank whereby, in the general case, each stator coil is treated as a separate generator, and feeds its generated energy into its own primary transformer winding in separately insulated relation to all other such generator coils and their associated primary transformer windings. In a preferable arrangement all machine coils generating E. M. F. of common time phase are connected to form a group, said group being composed of similarly located coils, one under each machine pole, and each such coil group is connected to its own primary winding in separately insulated relation to all other such machine coil groups and their associated primary windings. In this coil arrangement the slot pitch of the coils is purposely shortened so that no two coils in any coil group may be in juxtaposition at any point. By this arrangement the desired end is reached viz. no two adjacent coils are connected in the same electrical circuit and the number of leads connecting the machine and transformer are reduced in proportion to the number of poles in the machine.

A further preferable arrangement is to connect each such coil group with two other suitably located coil groups to form a three phase machine circuit and to wind and connect the transformer primary so that as many separately insulated three phase primary windings are provided as there are separately insulated three phase machine windings.

It is very evident that in the method of connecting generator windings as described above, the windings generate voltages of as many separate time phases as there are machine coils per pole and it is also evident that these voltages must all feed the primaries of a transformer from which secondary power is taken three phase. In general those stator coils which generate E. M. F. of most nearly the same time phase feed primary coils in inductive relation to secondary coils of one secondary phase. In the case of large machines each group of machine coils of common time phase will generally have a separate magnetic circuit in the transformer and will be in inductive relation to their own secondary coil and all such secondary coils in a secondary phase will be connected in series in E. M. F. additive relation to form a secondary phase. In smaller machines those primary coils feeding their generated energy to one secondary phase may have a magnetic circuit, to the primaries of several generator coils, but where this occurs those machine coils having most nearly the same time phase of generated E. M. F. will feed primaries on a common magnetic circuit and in such a manner that those generator coils feeding primaries on a common magnetic circuit are so connected that, in general, generator coils differing most in the time phase of their generated E. M. F. feed primaries mechanically spaced farthest apart on their common magnetic circuit.

The principles of my present invention are illustrated in the accompanying drawings, in which:—

Figure 1 is a wiring diagram showing one method of interconnecting generator windings with a transformer bank in accordance with the principles of this invention; Figure 2 is a wiring diagram showing a modified method of interconnecting the generator windings and transformer bank; and Figure 3 is a wiring diagram showing a further modified arrangement of transformer bank for connection with the generator windings.

Referring now to Figure 1, in the arrangement therein illustrated, I have shown a four-pole generator with 12 slots per pole in which machine coils similarly located under each pole and generating E. M. F. of common time phase are indicated by the same reference letters $a$, $b$, $c$, $d$, etc., to and including the letter $l$. The reference characters T', T2 and T3 indicate three single phase transformers, the cores of which respectively consist in laminated legs L1—L2, L3—L4, and L5—L6. On the legs L1 and L2 of one transformer T' are mounted the primary coils A, B, C and D each consisting of separately insulated circuits, viz., $a1$—$a2$, $a3$—$a4$, $a5$—$a6$, and $a7$—$a8$ on the leg L1; $b1$—$b2$, $b3$—$b4$, $b5$—$b6$ and $b7$—$b8$ on the leg L1; $c1$—$c2$, $c3$—$c4$, $c5$—$c6$, and $c7$—$c8$ on the leg L2; and $d1$—$d2$, $d3$—$d4$, $d5$—$d6$, and $d7$—$d8$ also on the leg L2. On the legs L3—L4 of the transformer T2 are mounted the primary coils E, F, G and H each consisting in separately insulated circuits, viz., $e1$—$e2$, $e3$—$e4$, $e5$—$e6$, and $e7$—$e8$ on the leg L3; $f1$—$f2$, $f3$—$f4$, $f5$—$f6$, and $f7$—$f8$ on the leg L3; $g1$—$g2$, $g3$—$g4$, $g5$—$g6$, and $g7$—$g8$ on the leg 4; and $h1$—$h2$, $h3$—$h4$, $h5$—$h6$, and $h7$—$h8$ also on the leg L4. On the legs L5 and L6 of the remaining transformer T3 are mounted primary coils I, J, K and L each consisting in separately insulated circuits, viz., $i1$—$i2$, $i3$—$i4$, $i5$—$i6$, and $i7$—$i8$ on the leg L5; $j1$—$j2$, $j3$—$j4$, $j5$—$j6$, and $j7$—$j8$ on the leg L5; $k1$—$k2$m $k3$—$k4$m $k5$—$k6$, and $k7$—$k8$ on the leg L6; and $l_1$—$l_2$, $l_3$—$l_4$, $l_5$—$l_6$, and $l_7$—$l_8$ also on the leg L6.

The four separately insulated circuits of each transformer primary are respectively connected to correspondingly lettered machine coils, and the four machine coils thus connected are respectively similarly located one each respectively under one of the four machine poles, consequently all four coils generate E. M. F. of common time phase. For example, the four machine coils $a$ generate E. M. F. of common time phase and feed the four separately insulated circuits $a1$—$a2$, $a3$—$a4$, $a5$—$a6$, and $a7$—$a8$ of the transformer primary coil A. Likewise the four machine coils $b$ feeding the four separately insulated primary circuits in the transformer primary coil B generate E. M. F. of common time phase, but these $b$ coils generate E. M. F. substantially 15 electrical degrees out of time phase with the $a$ coils. It will be evident, therefore, that the magnetic induction in the transformer primary coils A and B on the magnetic leg L1 must also be 15 electrical degrees out of time phase, consequently, in the arrangement shown in Figure 1, I provide a leakage path Q1 to take care of this small difference in time phase so that the part of the flux common to coils A and B may pass through them in tandem relation while that part of the flux not common to each coil may pass through the leakage paths Q1—P1 in shunt relation. The coils on the magnetic leg L2 are similarly disposed so that there is a time phase difference between the generated E. M. F. fed to coil C and to coil D of substantially 15 electrical degrees, the leakage path Q2 taking care of the difference. It will also be evident that there will be a difference in time phase of substantially 30 electrical degrees between the magnetic flux common to the coils A and B and the magnetic flux common to the coils C and D. The major part of the magnetic flux common to coils A—B and C—D passes through them all in series, while the smaller part of the magnetic flux not common to both said coil groups passes through the leakage path P1—P1 in shunt both to group A—B and to group C—D. It will be understood that the relative positions of the primary coils may be varied to alter the leakage flux distribution in P1—P1 as may be desired.

In like manner the e, f, g and h generator coils feed primary coils E, F, G and H of the transformer T2, magnetic flux leakage paths Q3, Q4 and P2—P2 being also provided in the transformer core; and, likewise, the i, j, k and l generator coils feed primary coils I, J, K and L of the transformer T3, magnetic flux leakage paths Q5, Q6 and P3—P3 being provided in the latter transformer core.

Throughout the transformer bank the primary coils are in inductive relation to secondary coils. In one such arrangement, as shown in Figure 1, in the single phase transformer T1 the primary coil A is in inductive relation to the secondary coil HA, the primary coil B is in inductive relation to the secondary coil HB, the coil C is in like relation to secondary coil HC, and the coil D is in like relation to secondary coil HD; in like manner in the single phase transformer T2, the primary coils E, F, G and H are respectively in inductive relation to secondary coils H2E, H2F, H2G and H2H; and in the single phase transformer T3, the primary coils I, J, K and L are respectively in inductive relation to secondary coils H3I, H3J, H3K, and H3L.

All secondary coils are shown connected in series in E. M. F. additive relation to form the secondary high voltage phase H H, which is shown connected at the neutral H to the corresponding secondary high voltage windings H H2 and H H3 and grounded at G.

From the drawings and the above description it will be apparent that each stator coil with its corresponding transformer primary coil constitutes an independent circuit, and consequently less costly insulation may be employed, for even though faults in such insulation should occur, the same are not likely to result in destruction of the windings, or likely to seriously interfere with the continuous operation of the machine at full load, since the creation of sudden high voltage pressures by shorts or grounds cannot occur. For example, each and every coil in the machine may be grounded simultaneously without interrupting operation, or any two coils in the machine may be electrically connected at any single point without causing a short circuit or interfering with continued operation of the machine under load, for there is substantially no inherent difference of electrical pressure between the various circuits which may cause damaging current to flow at the point of connection. The very fact that there is substantially no inherent difference of electrical pressure between the various circuits in and of itself renders a break down or failure of insulation highly improbable, and thus offers more or less insurance against the occurrence of faults in the machine. It is also evident that the machine by reason of the large number of circuits may be conveniently wound for less than the conventional large size machine voltage while it may feed its energy to a very high voltage transmission circuit H1, H2, H3.

The impedance between each primary coil and its secondary coil may be made substantially the same for all primary coils and may be small or great according to the desire of the designer to obtain a large short circuit current and good voltage regulation or a small short circuit current and relatively poor voltage regulation.

So far as the arrangement and detail construction of my invention is concerned it will be understood that various modifications may be made without departing from the principles and scope of my invention. For example, instead of using a transformer with leakage paths as in Figure 1, I may use four transformers without leakage paths one for each of the coils A, B, C, D and connect the four secondary coils in series, or I may use two transformers for each phrase each with a flux leakage path etc. It may also be pointed out that shell type transformers may be used in place of the above described core type transformers. It will be understood that the principles of my invention may be employed in connection with motors as well as with generators, in which case the novel arrangement of the circuits interconnecting the electrical machine windings with the transformer means remains the same, the directional flow of power merely being reversed.

It will also be obvious that I may vary the number of coils per pole per phase, for example, I may employ eight coils per pole per phase and eight corresponding primary coils each on transformers T1, T2, T3 with corresponding leakage paths or I might have shown eight coils per pole per phase and connected each polar phase of coils together in four groups of two coils to a primary circuit, treating each group of two coils precisely the same as a single coil in Figure 1.

Figure 2 shows a four pole, three phase turbo generator wound the same as the machine shown in Figure 1 but connected to form four separately insulated three phase circuits each differing from the other three only in the time phase of its generated E. M. F. The $a$, $e$ and $i$ coils form one three phase circuit. All these coils are connected at one end to the innermost of the group of pole connecting rings M, and this pole ring constitutes the neutral for this three phase circuit. The other ends of the $a$ coils connect to the innermost pole connecting ring in the phase group N of terminal rings. The other ends of the $e$ coils connect to the innermost pole connecting ring in the second phase group O of terminal rings. The other end of the $i$ coils connect to the innermost pole connecting ring in the third phase group P of terminal rings.

In Figure 2 the four $a$ coils are shown connected in multiple although these coils could be connected in series or series multiple if desired without affecting the intent or scope of the invention.

The three phase machine circuits are shown connected to three phase transformer primaries wound on the three phase transformers T4 and T5, the core of the transformer T4 having magnetic legs L7, L8, and L9, with connecting leakage paths Q7 and Q8; and the core of the transformer T5 having magnetic legs L10, L11, L12, with connecting leakage paths Q9 and Q10. The primary coils A, E, I are shown constituting the top coils of the transformer T4 and have their own neutral connection within the transformer. In the same manner, the coils B, F, J constitute a three phase primary circuit connecting to the machine three phase coil group $b$, $f$, $j$; said group of coils $b$, $f$, $j$, being connected at one terminal in common with one of the group of connecting rings M, and at their other terminals respectively to the respective pole connecting rings in the phase groups N, O, and P. In the same manner, the three phase transformer T5 is wound with two separate three phase primaries C, G, K and D, H, L, each three phase primary having its own neutral within the transformer, and being connected in circuit to corresponding machine three phase coil groups $c$, $g$, $k$ and $d$, $h$, $l$; said coils $c$, $g$, $k$ being connected at one terminal in common with one of the group of connecting rings M, and at their other terminals respectively to the respective pole connecting rings in the phase groups N, O, P; and said coils $d$, $h$, $l$ being connected at one terminal in common with one of the group of connecting rings M, and at their other terminals respectively to the respective pole connecting rings in the phase groups N, O, P.

It will be evident that the E. M. F. induced in the three phase primary A, E, I differs substantially 15 electrical degrees in time phase from the E. M. F. induced in the three phase primary B, F, J. The magnetic flux in the upper three coils also differs from the flux in the lower three coils substantially 15 electrical degrees. That part of the flux common to both the upper and lower coils in each transformer passes through these coils in series, while that part of the flux not common to an upper and lower coil passes the magnetic leakage paths Q7 or Q8 in the transformer T4 and through the magnetic leakage paths Q9 and Q10 in the transformer T5. It will be obvious that by the described system of connecting I have retained all the principal advantages of the instant invention heretofore referred to, while nevertheless greatly reducing the number of leads connecting the generator and transformers. Each primary coil is in inductive relation to a secondary coil. All secondary coils in any one phase are in series in E. M. F. additive relation. I have shown the three phase high voltage secondary windings connected in star and grounded (although it is evident that they could be connected in delta without affecting the intent or scope of my invention), the output ends of said secondary windings in each transformer phase being connected in series to the respective three phase transmission circuit H1, H2 and H3.

The number and arrangement of machine coils in slots as shown in Figure 2 is the same as the arrangement shown in Figure 1, except that in Figure 2 I have shown complete coils of only one of the four electrical circuits in order to illustrate more clearly the fact that no coil in any given electrical circuit is in juxtaposition with any other coil in the same electrical circuit, except only at cross-over points along the end connectors. I do not wish to be limited to the exact arrangement of machine coils as illustrated, however, since, e. g., each machine coil could be replaced by a group of coils connected up precisely the same as shown in the drawings without affecting the intent or scope of my instant invention, although in such case the slot pitch of the coils would be so shortened that groups of coils generating E. M. F. of common time phase would not occupy slots in common.

Referring now to Figure 3, I show therein four separately insulated three phase circuits $a$, $e$, $i$; $b$, $f$, $j$; $d$, $h$, $l$; and $c$, $g$, $k$ connected in circuit with corresponding primary coils in the transformers T6, T7 and T8. These three phase circuits connect to correspondingly lettered machine circuits in the manner shown in Figure 2. As heretofore fully described, the flux through the primary coil A of transformer T6 differs in time phase from the flux in the primary coil B thereof. The major part of that flux common to both coils A and B passes through the secondary coil H H1, while that part of the flux individually peculiar to primary coil A and to primary coil B passes around the coils A and B as a leakage flux. This leakage flux is produced without excessive circulating current being necessary in the coils A and B because, in the arrangement thereof as shown in Figure 3, said coils are spaced relatively far apart on the rather long magnetic leg L13 of the core of said transformer T6. A leakage path P4 is provided between the coils A—B and C—D since the difference in the time phase of the induced E. M. F. between these two groups of coils is relatively much greater than the difference in the time phase of the induced E. M. F. between either coils A and B or coils C and D; this arrangement and effect being duplicated in the transformers T7 and T8 with respect to other interconnected machine coil groups and transformer primaries, as will be clearly apparent from an inspection of said Figure 3.

As many changes could be made in the above constructions and many apparently widely different embodiments of this invention could be made without departing from the scope thereof, it is intended that all matter contained in the above description or shown in the accompanying drawings shall be interpreted as illustrative and not in a limiting sense.

I claim:—

1. A multipole electrical machine having uniformly distributed alternating current windings comprising a predetermined number of coils per pole, in which every coil under one pole is segregated within said machine from every other similarly located coil under every other pole, and interconnecting means in segregated relation external of said machine coil circuits for interconnecting said coils in groups having generated voltages of the same time phase.

2. In combination a multipole electrical machine having uniformly distributed alternating current windings comprising a predetermined number of coils per pole, in which every coil under one pole is segregated within said machine from every other similarly located coil under every other pole and a transformer bank having a plurality of separately insulated primary windings, said machine coils having generated voltages of the same time phase being connected to a transformer primary winding in separately insulated relation.

3. In combination, a multipole electrical machine having uniformly distributed alternating current windings comprising a predetermined number of coils per pole, in which every coil under one pole is segregated within said machine from every other similarly located coil under every other pole, a transformer bank having a plurality of separately insulated primary windings, said coils having generated voltages of the same time phase being connected to one of said primary windings, and secondary coils in said transformer bank in inductive relation to the primary windings thereof, said secondary coils being connected in polyphase relation.

4. In combination, a multipole electrical machine having uniformly distributed alternating current windings comprising a predetermined number of coils per pole, in which every coil under one pole is segregated within said machine from every other similarly located coil under every other pole all of said coils having generated voltages of the same time phase being connected in a group which is connected to two other groups of suitable time phase generated E. M. F. to form a three phase circuit, and each such separately insulated three phase machine circuit feeding a separately insulated power circuit.

5. A multipole electrical machine having uniformly distributed alternating current windings comprising a predetermined number of coils per pole, in which each coil has a short slot pitch and every coil under one pole is segregated within said machine from every other similarly located coil under every other pole and interconnected externally of said machine to form groups having generated voltages of the same time phase, each said group of coils being connected to two other groups of suitable time phase generated E. M. F. to form a three phase circuit, and each said separately insulated three phase machine circuit feeding a separately insulated power circuit.

6. In combination, a multipole electrical machine having uniformly distributed alternating current windings of a predetermined number of coils per pole, in which each coil has a short slot pitch and every coil under one pole is segregated within said machine from every other similarly located coil under every other pole and interconnected externally of said machine to form groups having generated voltages of the same time phase, each group of a given time phase being connected with two other suitably located groups to form a separately insulated three phase circuit, and a transformer bank having as many separately insulated three phase primary windings as there are separately insulated three phase machine circuits whereby each three phase machine circuit is connected to a three phase primary winding in separately insulated relation.

7. In combination, a multipole electrical machine having separately insulated uniformly distributed alternating current windings, an associated transformer bank having a single transformer magnetic circuit for each time phase of E. M. F. generated at the terminals of said machine windings, machine windings which generate a common time phase of E. M. F. being connected to feed primaries on one magnetic circuit, said magnetic circuits forming magnetic networks having interlinking leakage paths, whereby that component of the flux common to a number of transformer primaries interlinks those primaries in series relation, and that component of the flux peculiar to an individual primary interlinks that primary in shunt relation.

In testimony that I claim the invention set forth above I have hereunto set my hand this 1st day of June, 1927.

FRAZER W. GAY.

CERTIFICATE OF CORRECTION.

Patent No. 1,782,262.                           Granted November 18, 1930, to

FRAZER W. GAY.

It is hereby certified that error appears in the printed specification of the above numbered patent requiring correction as follows: Page 2, line 45, before the word "to" insert the word "common"; page 3, line 112, for "phrase" read phase; and that the said Letters Patent should be read with these corrections therein that the same may conform to the record of the case in the Patent Office.

Signed and sealed this 16th day of December, A. D. 1930.

(Seal)                                                        M. J. Moore,
Acting Commissioner of Patents.